D. F. FASSETT.
NUT LOCK.
APPLICATION FILED AUG. 21, 1914.
1,156,593. Patented Oct. 12, 1915.
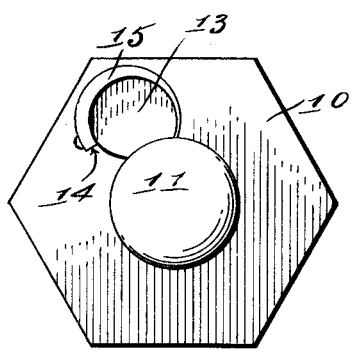
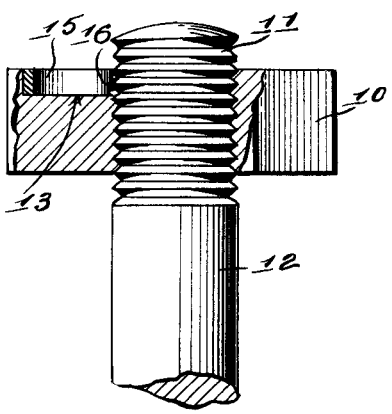
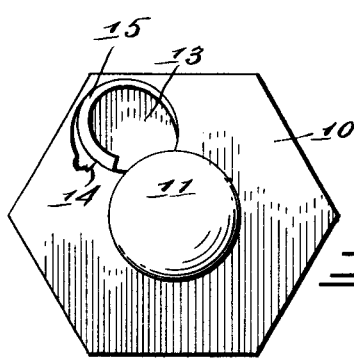
Witnesses
Edw. S. Hall.
Ross J. Woodward.
Inventor
Daniel F. Fassett.
By Richard B. Owen,
Attorney

UNITED STATES PATENT OFFICE.

DANIEL F. FASSETT, OF FAIRMOUNT, ILLINOIS, ASSIGNOR OF ONE-HALF TO JOSEPH A. SHIPPS, OF FAIRMOUNT, ILLINOIS.

NUT-LOCK.

1,156,593.  Specification of Letters Patent.  Patented Oct. 12, 1915.

Application filed August 21, 1914. Serial No. 857,928.

*To all whom it may concern:*

Be it known that I, DANIEL F. FASSETT, a citizen of the United States, residing at Fairmount, in the county of Vermilion and State of Illinois, have invented certain new and useful Improvements in Nut-Locks, of which the following is a specification.

This invention relates to a nut lock and the principal object of the invention is to provide improved means for releasably holding the nut in a locked position, the locking means being so mounted in the nut that it may be released, thus permitting the nut to be removed when desired.

Another object of the invention is to so mount the locking device that it will be securely held in a locking position, thus preventing any danger of its accidentally slipping out of the locking position.

This invention is illustrated in the accompanying drawings, wherein—

Figure 1 is an end view of a nut and bolt, the nut being locked upon the bolt by means of my improved locking means; Fig. 2 is a view showing the bolt in elevation and the nut broken away; Fig. 3 is an enlarged view of the locking means; Fig. 4 is a view similar to Fig. 1 with the locking means moved to a released position.

This invention includes a nut 10 which is screwed upon the threaded portion 11 of the bolt 12 and has its outer face provided with a cut out forming a socket 13, one side portion of which is enlarged to form the abutment shoulder 14. The locking pawl 15 which is formed from a tapered strip of resilient metal is curved as shown in Figs. 1 and 4 so that it will conform to the contour of the pocket 13 when put in place, with its larger end engaging the abutment shoulder 14 and its smaller end which terminates in teeth 16 engaging the threads of the bolt 12.

When this locking device is in place, the nut may be screwed upon the bolt with the teeth 16 engaging the threads as shown in Fig. 2. This permits the nut to be easily screwed tightly upon the bolt but prevents the nut from working loose since if it attempts to turn in the opposite direction, the teeth 16 will bind against the threads of the bolt and prevent the nut from turning. When it is desired to remove the nut, the larger end of the locking device may be forced out of engagement with the shoulder 14, thus permitting the locking device to turn to the position shown in Fig. 4. In this position, the teeth 16 will not engage the threads of the bolt and therefore the nut can be easily removed.

What is claimed is:—

In a nut lock a bolt provided with a threaded end, a nut screwed upon the threaded end of said bolt and having its outer face provided with a cut out forming a seat communicating with the threaded opening of said nut and having one side portion enlarged to provide an abutment shoulder, and a locking element formed of tapered resilient material fitting in said pocket and conforming to the contour thereof and having its larger end portion engaging said abutment shoulder and having its tapered end portion terminating in teeth engaging the threads of said bolt.

In testimony whereof I affix my signature in presence of two witnesses.

DANIEL F. FASSETT.

Witnesses:
T. J. WOLFE,
WM. DEHAVEN.

Copies of this patent may be obtained for five cents each, by addressing the "Commissioner of Patents, Washington, D. C."